(12) United States Patent
Biswal et al.

(10) Patent No.: US 10,944,727 B2
(45) Date of Patent: Mar. 9, 2021

(54) SYSTEM AND METHOD TO SECURE THE STREAMING OF MEDIA TO A VALID CLIENT

(71) Applicant: AIRWATCH LLC, Atlanta, GA (US)

(72) Inventors: Anshuman Biswal, Bangalore (IN); Akshay Laxminarayan, Bangalore (IN); Rammani Panchapakesan, Bangalore (IN)

(73) Assignee: AIRWATCH LLC, Atlanta, GA (US)

( * ) Notice: Subject to any disclaimer, the term of this patent is extended or adjusted under 35 U.S.C. 154(b) by 848 days.

(21) Appl. No.: 15/222,967

(22) Filed: Jul. 29, 2016

(65) Prior Publication Data
US 2017/0264593 A1 Sep. 14, 2017

(30) Foreign Application Priority Data
Mar. 14, 2016 (IN) .............................. 201641008864

(51) Int. Cl.
*H04L 29/06* (2006.01)
*H04L 9/14* (2006.01)
*H04L 9/08* (2006.01)

(52) U.S. Cl.
CPC ........ *H04L 63/0428* (2013.01); *H04L 9/0861* (2013.01); *H04L 9/14* (2013.01); *H04L 63/06* (2013.01); *H04L 63/083* (2013.01)

(58) Field of Classification Search
USPC ........ 713/168, 150, 163, 181; 726/2, 21, 36; 380/255, 264, 276
See application file for complete search history.

(56) References Cited

U.S. PATENT DOCUMENTS

| | | | | |
|---|---|---|---|---|
| 10,162,943 B2* | 12/2018 | Park | ....................... | H04L 9/088 |
| 2003/0174842 A1* | 9/2003 | Challener | ............... | G06F 21/62 |
| | | | | 380/277 |
| 2005/0132204 A1* | 6/2005 | Gouguenheim | ........ | G06F 21/10 |
| | | | | 713/185 |
| 2007/0057048 A1* | 3/2007 | Plotkin | ............... | H04L 63/0428 |
| | | | | 235/382 |
| 2008/0109642 A1* | 5/2008 | Beutler | ................. | G06F 11/165 |
| | | | | 712/225 |
| 2009/0328177 A1* | 12/2009 | Frey | ...................... | H04L 9/3213 |
| | | | | 726/9 |
| 2010/0017615 A1* | 1/2010 | Boesgaard Sorensen | .................. | |
| | | | | G06F 21/64 |
| | | | | 713/176 |
| 2010/0257578 A1* | 10/2010 | Shukla | .................. | H04L 9/3234 |
| | | | | 726/1 |
| 2011/0145581 A1* | 6/2011 | Malhotra | ......... | H04N 21/43615 |
| | | | | 713/171 |
| 2012/0324552 A1* | 12/2012 | Padala | .................. | H04L 9/3213 |
| | | | | 726/6 |

(Continued)

*Primary Examiner* — Sharif E Ullah
(74) *Attorney, Agent, or Firm* — Thomas | Horstemeyer, LLP (57) ABSTRACT

Disclosed are various examples for securing the streaming of a media file from a web service to a media player. A request for a portion of a media file can be received including an authentication key. A web service can validate the authentication key. If the authentication key validates, the web service can send the portion of media to a media player. The media player can render the media on a display of a client device. Requests can be iteratively sent for each portion of the media file.

20 Claims, 4 Drawing Sheets

(56) References Cited

U.S. PATENT DOCUMENTS

| | | | | |
|---|---|---|---|---|
| 2013/0219178 | A1* | 8/2013 | Xiques | H04L 63/08 |
| | | | | 713/168 |
| 2013/0318358 | A1* | 11/2013 | Wang | G06F 21/31 |
| | | | | 713/182 |
| 2014/0079221 | A1* | 3/2014 | McCallum | H04L 9/0822 |
| | | | | 380/277 |
| 2014/0331297 | A1* | 11/2014 | Innes | H04L 63/0281 |
| | | | | 726/7 |
| 2015/0222697 | A1* | 8/2015 | Bassiouny | H04L 69/18 |
| | | | | 709/203 |
| 2017/0316185 | A1* | 11/2017 | Park | H04L 67/306 |

* cited by examiner

SYSTEM AND METHOD TO SECURE THE STREAMING OF MEDIA TO A VALID CLIENT

RELATED APPLICATIONS

Benefit is claimed under 35 U.S.C. 119(a)-(d) to Foreign Application Serial No. 201641008864 filed in India entitled "SYSTEM AND METHOD TO SECURE THE STREAMING OF MEDIA TO A VALID CLIENT", filed on Mar. 14, 2016, by AIRWATCH LLC, which is herein incorporated in its entirety by reference for all purposes.

BACKGROUND

Applications can encrypt and store files in memory to prevent access by unauthorized applications. An application can encrypt a file using a secret key and store the file on a memory device, such as a hard drive. Only applications with access to the secret key can access the file on the memory device. When a user requests access of a file, the operating system can launch a preconfigured application to access the file based on the type of file. For example, if a media file is accessed by a user, the operating system can be configured to launch a media player to play the media file. If the media file is stored in an encrypted format, the media player cannot access the media file without the media file being decrypted first. Further, if access to the media file is restricted by an application, media players that are written by third-party developers may omit the functionality to request the file from the application.

Third-party media players can include functionality to stream video from a web service. An application with access to the media file can provide decrypted access to the video using a web service. To prevent unauthorized access, the video can be streamed using a secure socket layer (SSL) connection to secure the communication. However, securing communication of data can require significant system resources. As an example, a client device can perform numerous mathematical calculations to secure web traffic when using RSA encryption through an SSL connection. The resources required to secure a transmission can increase when the web traffic is transmitted from a web service running on the client device. In other words, when a media player running on a client device streams a media file from a web service on the same client device, securing this transmission can increase the system resources that are required to access the media. The increase in resources can be disproportionate to the resources required to play the media without securing the communications.

In addition, when a web service hosts a media file on a socket, any application can connect to the socket to request the media file. A web service might be unable to ensure that a request for the media file originates from a trusted source. Even if the web service could validate the source of the request, the communications can be monitored by other applications. If an entire media file is transmitted, other applications can observe the communications and store a copy of the media file, even if only a portion of the file is rendered by the media player.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to securing the streaming of media from a web service to a media player executed on a single client device. According to one example, a user of a client device can request to play media, such as video or audio content, that is stored in a secured storage location on the client device. A media player and a web service executed on the client device can facilitate secure playback of the media. A file management application can generate initialization data to secure the streaming of the media from the web service to the media player. The file management application can securely send the generated initialization data to the media player and the web service. For example, the file management application can initiate execution of the media player and include the initialization data as a parameter. The file management application can also execute the web service as part of the file management application, such as in a thread. In this scenario, the file management application and the web service can share access to memory. When the file management application executes the web service, the web service can receive the initialization data and a path to the media in the shared memory. The web service can then send a Uniform Resource Locator (URL) corresponding to the media to the file management application. The media player can securely receive the initialization data and the URL returned by the web service.

The media player can request portions of the media from the web service by connecting to the URL of media hosted by the web service. For example, the media player can request an initial portion of the media upon startup and request additional portions of the media as the media is played. The media player can use the initialization data to generate a series of authentication keys. For example, each time the media player requests a portion of the media, the media player can generate the next authentication key in the series and include the generated authentication key in a request for a portion of media. The media player can include the authentication key in the header of the request for the portion of the media.

The web service can bind to a network device to receive network requests. According to one example, the web service can bind to a local address, such as localhost, so that the web service does not receive connections originating from a network address that is outside the client device. The web service can also load or access the media to be provided by the web service. As an example, the web service can decrypt the media stored in an encrypted storage location. In one example, the web service can be executed within a file management application. The file management application can provide the web service with a mechanism to access to the media in a decrypted format. As an example, the file management application can provide an Application Programming Interface (API) to the web service. The web service can call the API to access the media. In one example, the web service is executed within the file management application and the API is a local function call. The media can be stored in a manner so that the media can be accessible exclusively from the file management application.

The web service can also receive a request on the URL for a portion of the media. In one example, the request is a Hypertext Transfer Protocol (HTTP) request. The web service can ensure that the request is from a trusted source, such as the media player, using the initialization data. The web service and media player can use the same initialization data to generate a series of authentication keys. The web service can ensure that the request is from a trusted source by requiring that each request for a portion of media includes the next authentication key in the series. The initialization data can include an initialization token, an encryption key, and an algorithm. The initialization token and encryption keys can be random strings. The algorithm can specify one of several algorithms that can be applied to the initialization token. As an example, the initialization data can specify an algorithm that increments the initialization token on each iteration. The web service and media player can apply the algorithm to the initialization token. The web service and media player can encrypt the result of the algorithm with the encryption key to generate an authentication key. The algorithm can be iteratively applied to the initialization token, with the results being encrypted with the encryption key, to generate a series of authentication keys.

The web service can generate a first authentication key using the initialization data. The web service can also determine a second authentication key from the request for the portion of the media. In one example, the web service extracts the second authentication key from a header of an HTTP request. The web service can compare the first authentication key to the second authentication key to ensure the request is from a trusted source. For each subsequent request for a portion of the media, the web service can generate a new first authentication key based on the initialization data and the previous authentication keys to verify the request originated from the trusted source. Each authentication key in the request from the media player to the web service might be viewable by other applications executed on a client device. However, because the initialization data is only known to trusted applications, such as the file management service, the web service, and the media player, other applications are unable to generate the next authentication key in the series. Without the ability to generate subsequent authentication keys, other applications cannot successfully request media from the web service.

Figure 1:
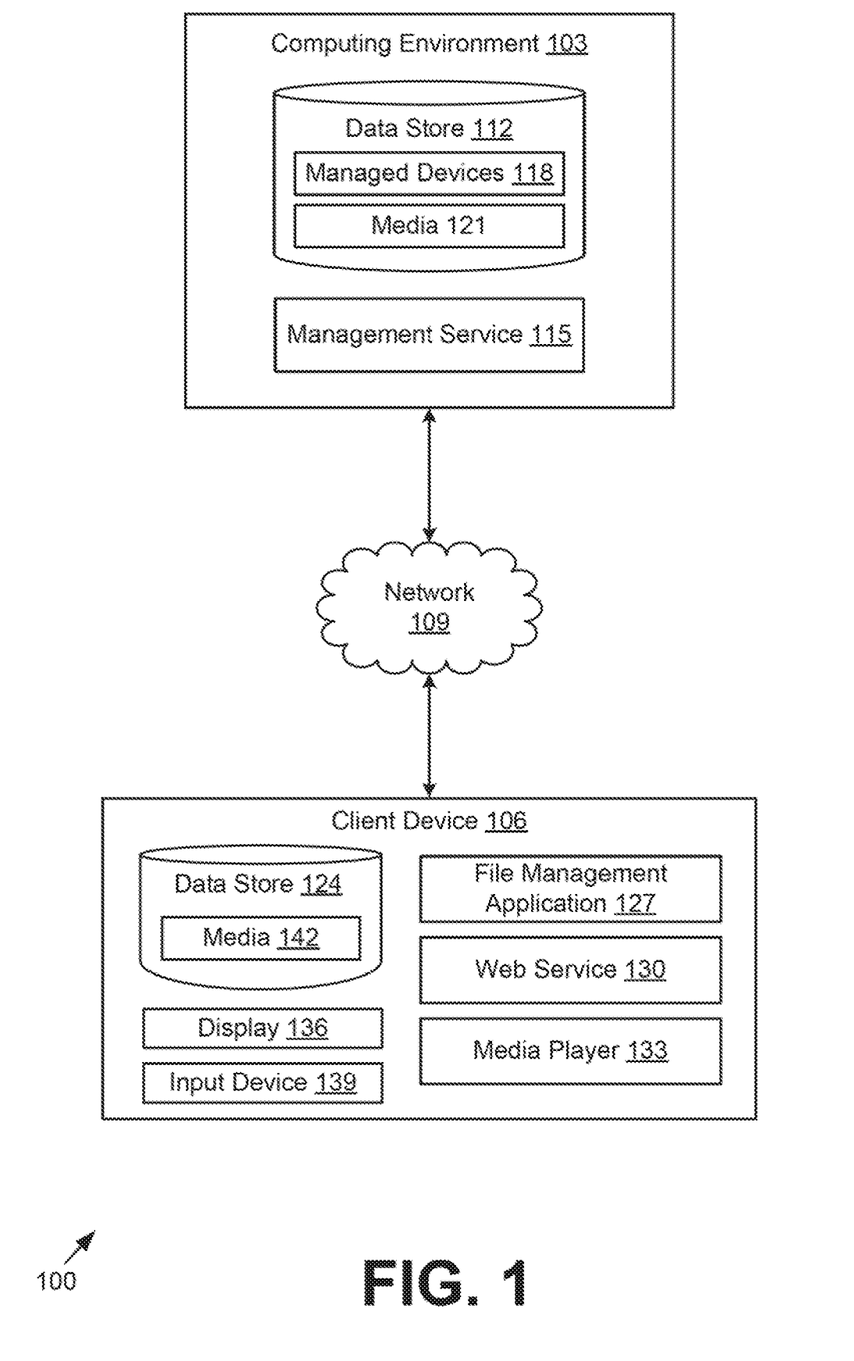
FIG. 1 is a drawing of a networked environment according to various examples of the present disclosure.

With reference to FIG. 1, shown is a networked environment 100 according to various examples. The networked environment 100 shown in FIG. 1 includes a computing environment 103, a client device 106, and potentially other components, which are in data communication with each other over a network 109. The network 109 includes, for example, the Internet, intranets, extranets, wide area networks (WANs), local area networks (LANs), wired networks, wireless networks, other suitable networks, or any combination of two or more networks. The networks can include satellite networks, cable networks, Ethernet networks, telephony networks, or other types of networks.

The computing environment 103 can include, for example, a server computer or any other system providing computing capabilities. Alternatively, the computing environment 103 can employ multiple computing devices that may be arranged, for example, in server banks, computer banks, or other arrangements. The computing devices can be located in a single installation or may be distributed among many different geographical locations. For example, the computing environment 103 can include multiple computing devices that together form a hosted computing resource, a grid computing resource, and any other distributed computing arrangement.

In some cases, the computing environment 103 operates as at least a portion of an elastic computing resource where the allotted capacity of processing, network, storage, or other computing-related resources may vary over time. The computing environment 103 can also include or be operated as virtualized computer instances that are executed in order to perform the functionality that is described herein. Generally, the computing environment 103 can be operated in accordance with particular security protocols such that it is considered a trusted computing environment.

Various systems can be executed in the computing environment 103. Also, various data is stored in a data store 112 that is accessible to the computing environment 103. The data store 112 shown in FIG. 1 can be representative of multiple data stores 112. The data stored in the data store 112 is associated with the operation of the various components described below.

A management service 15 and other services can be executed in the computing environment 103. The management service 115 can manage and oversee the operation of one or more client devices 106. The management service 115 can manage access to the media 121 from various client devices 106. That is, the management service 115 can determine whether a user, a device, or a pairing of a user and a device are authorized to access the media 121 based on access rights. In one example, access rights are compliance rules that can be determined at the time of the access request. The management service 115 can provide media 121 to authorized client devices 106. The management service 115 can also manage and oversee media 121 stored in data store 112.

The management service 115 can facilitate enrollment of a client device 106 on behalf of a user account. In one example, an employer can operate the management service 115 to ensure that the client devices 106 of its employees operate in compliance with the security policies. In another example, an employer can configure the management service 115 to enforce different policies (or no policies at all) based upon which users or employees are currently logged into or otherwise operating the client device 106. The management service 115 can also facilitate access to email, calendar data, contact information, and other resources provided by the computing environment 103 or accessible on the client device 106.

The managed devices 118 can include information regarding the client devices 106 that are managed and controlled by the management service 115. The managed device 118 that corresponds to a particular client device 106 can include, for example, the identification of a user assigned to the client device 106, a status as administrator on the client device 106 for a user account, whether an agent is installed on the client device 106, an identification of applications that are installed in the client device 106, historical data regarding the operation of the client device 106, a list of profiles installed on the client device 106, an indicia of enrollment on the client device 106, geographic locations and time periods that the client device 106 is configured to be operable, and other information.

In addition, the managed device 118 for a particular client device 106 can include one or more device profiles. A device profile can include settings embodied in a file. When a device profile is installed on a client device 106, the client device 106 can force functions or applications executed on the client device 106 to adhere to the settings embodied in the file. The managed device 118 can also include a set of compliance rules that can be specified by the management service 115. The management service 115 can assign various compliance rules to a client device 106, a user account associated with the client device 106, or to a pairing of the client device 106 and the user account associated with the client device 106.

The compliance rules can specify conditions that must be satisfied for a client device 106 to be deemed compliant with the compliance rule. In one example, a compliance rule can specify that particular applications are prohibited from being installed on a client device 106. In another example, a compliance rule can specify that a lock screen is required to be generated when the client device 106 is "awoken" from a low power (e.g., "sleep") state and that a passcode is required for a user to unlock the lock screen. Additionally, some compliance rules can be based on time, hardware configuration, software configuration, geographical location, network properties, or other predefined conditions.

When the compliance rules for a particular device profile are satisfied, the management service 115 can determine that the corresponding client device 106 is compliant with the device policy. As an example, if a compliance rule specifies that a maximum size per chunk of a media file is 1 MB, but a client device 106 is configured to transmit 2 MB chunks, then media playback is prohibited. In this example, if the compliance rule is subsequently changed to allow a maximum of 2 MB chunks on the client device 106, then media playback becomes enabled. If the configuration for the client device 106 is modified such that the chunk size is below or meets the threshold chunk size allowed by the compliance rule, then the media playback can become enabled.

As another example, a client device 106 can fail to satisfy a compliance rule if an agent is not installed on the client device 106, and media playback can be prohibited until the agent is installed and the compliance rule is satisfied. In yet another example, the client device 106 can satisfy a compliance rule when a client device 106 is located within a particular geographic location. In one example, a client device 106 can satisfy a compliance rule when the client device 106 is in communication with a particular network 109, such as a particular local area network that is managed by the computing environment 103. Furthermore, a compliance rule in another example can be satisfied upon the time and date matching specified values.

Another example of a compliance rule involves whether a user belongs to a particular group of authorized users. A compliance rule can include a whitelist or a blacklist that specifies whether particular users or groups of users are authorized users. In various examples, the computing environment 103, the client device 106, or a combination of both the computing environment 103 and the client device 106 can determine whether a client device 106 satisfies a compliance rule.

In some examples, a company can operate the management service 115 to ensure that the client devices 106 of its users satisfy respective compliance rules. By ensuring that the client devices 106 of its users are operating in compliance with the compliance rules, the company can control access to resources to thereby improve the security of client devices 106 associated with the company and the users of the client devices 106.

The file management application 127 can read and write to the media 142. In one example, the file management application 127 receives the media 142 from the management service 115 and stores the media 142 in data store 124. The file management application 127 can perform a sync of media 142 with any media 121 associated with a user account authenticated for the client device 106. The file management application 127, web service 130, and media player 133 can be used to create, access, edit, or perform other functions with respect to media 142.

According to one example, the management service 115 can restrict the file management application 127 from transferring changes from media 142 to media 121 based on compliance rules if the user account is limited to read only access. In one example, the file management application 127 is still able to write changes to the media 142 locally to data store 124 when the user account is not authorized for write permissions. In another example, the file management application 127 prevents the media 142 from being saved to data store 112 or 124 if the user account is not authorized to edit the media 142. The file management application 127 can query the management service 115 to determine permissions for the user account. As an example, the file management application 127 or management service 115 can determine a user account is not authorized if a compliance rule corresponding to the client device 106 is not satisfied.

The compliance rule can be tied to a specific operation, such as write access to media 142. For example, a client device 106 can gain write access to media 142 by satisfy a compliance rule that requires the client device 106 to be located within a particular geographic location. In this example, the client device 106 can write to media 142 while the client device 106 is within the particular geographic location, but can be restricted from writing to media 142 while the client device 106 is outside of the particular geographic location.

According to one example, a client device 106 must have a user account validated by the management service 115 in order to access the media 121. The management service 115 can restrict permissions for the client device 106. For example, an employer can grant a first user account access to read and write to media 121, while granting only read access for the media 121 to a second user account. In this example, the management service 115 can authorize the first user account to read and write to the media 121 while restricting the second user account to only reading the media 121. The management service 115 can provide the file management application 127 with access to media 121 that are authorized by the management service 115 for the user account.

The client device 106 is representative of multiple client devices 106 that can be coupled to the network 109. The client device 106 can include, for example, a processor-based system such as a computer system. The computer system can be exemplified in the form of a desktop computer, a laptop computer, a personal digital assistant, a mobile phone (e.g., a "smartphone"), a set-top box, a music player, a web pad, a tablet computer system, a game console, an electronic book reader, or any other device with like capability. The client device 106 can include a data store 124, a file management application 127, a web service 130, a media player 133, and other components. The client device 106 can include a display 136 as well as input devices 139, such as a mouse, touch pad, or touchscreen that facilitates a user input or other types of data input into the client device 106.

The file management application 127 can access, manage, edit, or perform other functions with respect to files, such as media 142, and other files. As examples, media 142 can include an image, a video, and other files. The web service 130 can be a portion of the file management application 127. For example, the file management application 127 can run a web service 130 as a thread or initiate a web service 130 within the file management application 127 as a containerized application. To initiate the web service 130 as a containerized application, the file management application can encapsulate the web service 130 in a container with its own operating environment.

The file management application 127 can generate initialization data. The file management application 127 can send or pass the initialization data to the web service 130 and the media player 133. The initialization data can include an initialization token, an encryption key, and an algorithm. In one example, the initialization token and encryption key can be alphanumeric strings. In another example, the encryption key is a numeric value having a number of bits. The file management application 127 can generate the initialization token and encryption key by randomly selecting a preconfigured number of characters, such as with a random number generator (RNG). The file management application 127 can randomly choose the number of characters in the initialization token or encryption key.

According to one example, the encryption key can be a six byte string. In another example, the encryption key is one of a 128-bit key, 192-bit key, 256-bit key, or other size key for Advanced Encryption Standard (AES) encryption. The algorithm can be a single algorithm or a combination of multiple algorithms. The algorithm can include a left shift rotation (LSR), a right shift rotation, left shift logical, right shift logical, increment by a number, decrement by a number, invert a bit, and other algorithms. As an example, the algorithm can be used to invert the fourth bit and right shift rotation the result. The file management application 127 can select one or more of the algorithms when the initialization data is generated.

In one example, the file management application 127 can determine a number of algorithms using an RNG. In this example, the file management application 127 can select the number of algorithms from a group of algorithms. The file management application 127 can vary parameters associated with the algorithms. In a first example, the file management application 127 can randomly select to use the LSR algorithm with a shift of one bit per iteration. In a second example, the file management application 127 can randomly select to use the LSR algorithm with a shift of three bits per iteration.

The file management application 127 can securely transfer the initialization data to the media player 133. In one example, the media player 133 and the file management application 127 can be signed by the same certificate. When an application is published, the application can be signed by a company publishing the application. If the same company publishes two applications, the two applications can be signed by the same certificate. In a mobile operating system, such as Android®, two applications signed by the same certificate can securely communicate between the applications using the common signature. Sending a message is in this manner can be referred to as sending a signature intent. In one example, the file management application 127 can send the initialization data to the media player 133 using a signature intent.

In another example, the media player 133 can be an application that is signed by a different certificate than the file management application 127. The media player 133 can be published by a different company than the file management application 127. The management service 115 can manage access and permissions for the file management application 127, the web service 130, and the media player 133. As an example, the management service 115 can authorize or restrict access to media 121 or 142 for the client device 106 based on managed devices 118. As another example, the management service 115 can authorize or restrict permissions to use the file management application 127, the web service 130, or the media player 133.

According to one example, the management service 115 can securely communicate with the file management application 127, the web service 130, and the media player 133. In this example, when the media player 133 is signed by a different certificate, the media player 133 can receive the initialization data from the file management application 127 through the management service 115. The file management application 127 can transmit the initialization data to the management service 115, and the management service 115 can transmit the initialization data to the media player 133.

The web service 130 and the media player 133 can use the initialization data to generate authentication keys. Authentication key are a series of strings that can be generated in an application using initialization data, such as an initialization token, an algorithm, and an encryption key. A first application can generate a first set of authentication keys using initialization data. If a second application uses the same initialization data to generate another set of authentication keys, then the two sets of authentication keys will correspond to one another. An authentication key at a position in the series that is generated by either the web service 130 or the media player 133 will match. For example, the third authentication key in the series generated by the media player 133 will be the same value as the third authentication key in the series generated by the web service 130.

The algorithm, initialization token, and encryption key from the initialization data can be used to generate an authentication key. For the first authentication key in a series, the algorithm can be applied to the initialization token to generate a string. The resulting string can be encrypted with the encryption key to create the authentication key. For subsequent authentication keys, the algorithm can be applied to the resulting string from the previous authentication key to generate a new string. The new string can be encrypted using the encryption key to generate the next authentication key in the series.

The media player 133 can send a request for portions of media 142. The request can include an authentication key generated by the media player 133. The web service 130 can validate the authentication key. As an example, the web service 130 can generate an authentication key. For example, the web service 130 can apply the algorithm to the initialization token and can encrypt the result with the encryption key to generate the authentication key. The resulting authentication key can be a string. The web service 130 can compare the generated authentication key to the received authentication key. If the authentication keys match, the web service 130 can send a portion of the media 142 to the media player 133. The media player 133 can render the portion of the media 142 on the client device 106. The media player 133 can iteratively request portions of the media 142 using iterative authentication keys. The media player 133 can stop requesting portions of the media 142 if a user closes the media player 133, stops or pauses the media 142, selects another media 142 to play, or otherwise ceases playback of the media 142. If the media 142 is resumed, the media player 133 can resume requesting portions of the media 142 from the web service 130 using the next authentication key in the series.

In one example, the size of a portion of the media 142 requested can be determined by the web service 130. As an example, the media player 133 can request a first portion from the web service 130, and the web service 130 can return a one megabyte (MB) section of media 142 based on a configuration setting associated with the web service 130. In another example, the media player 133 can include a chunk size in the request for the portion of the media 142. The web service 130 can require that the requested chunk size be between a minimum and maximum threshold. In another example, the size of the portion of the media 142 can be based on properties of the media 142. For example, the web service 130 can base the size of the portion on the total running time of the media 142, the size of the media 142, and other metadata associated with the media 142. As an example, the web service 130 can select a size for the portion to ensure that each portion is at least 3 seconds long. In another example, the web service 130 can select a size for the portion to ensure that the entire media 142 is transmitted in 100 or less iterations.

The data store 124 can include media 142. According to one example, the client device 106 is associated with a user account authenticated by the management service 115. The file management application 127 can transmit an authentication credential to the management service 115 to authenticate the client device 106. Once authenticated, the management service 115 can provide the file management application 127 with access to media 142 associated with a user account corresponding to the client device 106.

The media 121 and 142 can include metadata describing the contents of the media 121 and 142. The metadata can include authors, last modified date, last synced date, a unique identifier, and other properties of the media 121 and 142. The unique identifier can be shared between the media 121 and 142. In one example, media 121 and media 142 have the same unique identifier when the media 121 and 142 are synced.

The media 121 and 142 can include media in various formats including audio files, video files, image files, and other formats. The media 121 and 142 can be encoded with a codec. The media 121 and 142 can be stored as an encrypted file. In one example, a specific application can be used to access and decrypt the encrypted media 121 and 142, such as the management service 115 or file management application 127.

Figure 2:
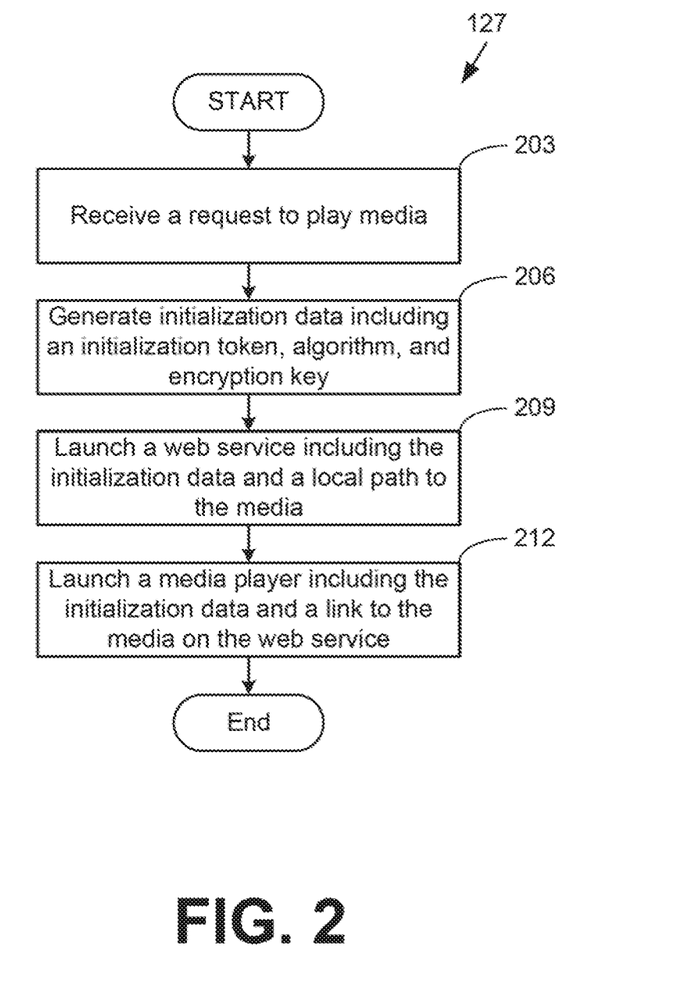
FIGS. 2-4 are flowcharts illustrating examples of functionality implemented as portions of a file management application, a web service, and a media player executed in a computing environment in the networked environment of FIG. 1 according to various examples of the present disclosure.

Referring next to FIG. 2, shown is a flowchart that provides one example of the operation of a portion of the file management application 127. As an alternative, the flowchart of FIG. 2 can be viewed as depicting an example of elements of a method implemented in the client device 106. FIG. 2 illustrates an example of how the file management application 127 can initialize and start a web service 130 and media player 133 to securely play a requested media 142 on a display 136.

At step 203, the file management application 127 receives a request to play media 142. As an example, a user of the client device 106 can browse a list of available media, such as media 142 stored on the client device 106 or media 121 that the user is authorized to view. A user on a client device 106 can be authorized to access a particular media 121 or 142 if a compliance rule is satisfied. In one example, the file management application 127 limits the list of available media to media 142 when in an offline state, such as when network 109 or computing environment 103 is inaccessible. In another example, the file management application 127 includes media 121 in the list of available media when in an online state, such as when computing environment 103 is accessible over network 109.

The user can select one of the media items in the list of available media. If user selects media 121 that does not correspond to media 142, the file management application 127 can send a request to management service 115 for the media 121. The media 121 can be downloaded and stored as an encrypted file in media 142. According to one example, a compliance rule can require that the media 121 or 142 only be decrypted on a chunk-by-chunk basis as the media 121 or 142 is played. Compliance rules can be evaluated before each chunk is decrypted. In one example, the file management application 127 receives the media 121 and stores the media 121 in data store 124 as media 142. In another example, the file management application 127 caches the media 121 in a memory of the client device 106 without storing a copy in data store 124. The file management application 127 can receive and cache the media 121 in an encrypted format. The file management application 127 can decrypt portions of the media 121 as the portions are needed or requested.

At step 204, the file management application 127 can evaluate any applicable compliance rules. As an example, a compliance rule can require that the media 121 or 142 be streamed in chunks. A compliance rule can include a maximum size of each chunk transmitted. As another example, a compliance rule can require that the media 121 or 142 be signed by a trusted certificate authority and encrypted. If a compliance rule is not satisfied the file management application 127 can prevent the media 121 or 142 from being accessed until the compliance rule is satisfied. The file management application 127 can also adjust configurations in order to satisfy a compliance rule. As an example, if a compliance rule requires chunks of media 121 or 142 be no larger than 1 MB, the file management application 127 can adjust a configuration option that sets the size of chunks in order to comply with the compliance rule. In one example, a setting or configuration option in a device profile corresponding to the client device 106 is altered to enforce compliance with the compliance rule.

At step 206, the file management application 127 can generate initialization data. The initialization data can include an initialization token, an encryption key, and an algorithm. For example, the file management application 127 can generate initialization data including an initialization token, an encryption key, and an algorithm. The initialization token and encryption key can be alphanumeric strings. The file management application 127 can generate the initialization token and encryption key by randomly selecting a preconfigured number of characters, such as with an RNG. The file management application 127 can randomly choose the number of characters in the initialization token or encryption key.

The initialization token length can be based on the length of the requested media 142. According to one example, the algorithm can perform an LSR on the bits of the initialization token for each portion requested of the media 142. In this example, the file management application 127 can generate the initialization token with more bits than the number of portions in the media 142 to ensure that the result never duplicates. The file management application 127 can determine the number of portions in the media 142 by dividing the size of the file by the size of the requested portion and rounding the result up. As a further example, if a 50 MB media 142 is requested in 100 KB portions, the file management application 127 can generate an initialization token including more than 500 bits, such as an eight character string in UTF-8 or a four character string in Unicode.

The file management application 127 can iteratively apply the algorithm to the initialization token to determine if the resulting strings include duplicate strings or a repeating pattern of strings when the algorithm is applied a number of times equal to the number of portions in the media 142. The file management application 127 can also encrypt the resulting strings with the encryption key to determine if a repeating pattern results in the authentication keys if the algorithm is applied a number of times equal to the number of portions in the media 142. According to the above example, the file management application 127 can iterate the LSR algorithm on a resulting eight character UTF-8 initialization token 500 times to determine if a pattern occurs during the iterations. If duplicate strings or a repeating pattern occurs, the file management application 127 can discard the current initialization token and generate another initialization token or discard the selected algorithm and select another algorithm. When the file management application 127 determines that a pattern does not occur for an initialization token, the initialization token can be used in the initialization data.

At step 209, the file management application 127 can launch a web service 130 including the initialization data and a local path to the media 142. The web service 130 can be launched in a secure area by running the web service 130 within a containerized application. As an example, the file management application 127 can start the web service 130 within the file management application 127, such as in a thread. The file management application 127 can store the initialization data in local memory for access by the web service 130. The file management application 127 can provide the web service 130 with access to media 142. For example, the file management application 127 can decrypt the media 142 and provide the decrypted media to the web service 130. In some examples, the web service 130 requests a portion of media 142. In these examples, the file management application 127 decrypts and provides only the portion of the media 142 requested by the web service 130. When in a decrypted form, the media 142 can be exclusively stored in local memory until streamed by the web service 130 to prevent an external application from accessing the media 142 in the decrypted form.

The file management application 127 can start the web service 130 with a local path to media 142. As an example, the file management application 127 can receive a request to play a specific media 142 and start the web service 130 with the path to that specific media 142 to the web service 130. Upon starting, the web service 130 can listen for connections. As an example, the web service 130 can bind as a server process to a socket and port to listen for incoming connections. In one example, the web service 130 binds to a localhost on port 80. In another example, the web service 130 binds to a localhost on another configured port.

The web service 130 can send a URL corresponding to the media 142 to be played. The URL can be sent by returning the URL to the file management application 127 when the web service 130 is started. The URL can also be sent by storing the URL in a local memory shared between the file management application 127 and the web service 130. According to one example, the web service 130 can bind to localhost on port 8080 and return a URL of http://localhost:8080/media.mpeg.

At step 212, the file management application 127 can launch a media player 133 including the initialization data and a link to the media 142 on the web service 130. The media player 133 can be launched in an unsecure area by launching or executing the media player 133 without using a containerized application. In an example of launching the media player 133 in an unsecure area, the file management application 127 can bootstrap the media player 133 with the initialization data upon execution. The file management application 127 and the media player 133 can be signed by the same certificate. When signed by the same certificate, the file management application 127 can send the initialization data to the media player 133 using the shared signature, such as with signature intents.

The file management application 127 can securely transfer the initialization data to the media player 133. In one example, the media player 133 and the file management application 127 can be signed by the same certificate. When an application is published, the application can be signed by a company publishing the application. If the same company publishes two applications, the two applications can be signed by the same certificate. In a mobile operating system, such as Android®, two applications signed by the same certificate can securely communicate between the applications using the common signature. Sending a message is in this manner can be referred to as sending a signature intent. In one example, the file management application 127 can send the initialization data to the media player 133 using a signature intent.

The media player 133 can also be launched in a secure area, such as within a containerized application. For example, the file management application 127 can start the media player 133 in a thread of the file management application 127. In this example, the file management application 127 can pass the initialization data to the media player 133 using local memory on the client device 106. As an example, the file management application 127 can store the initialization data in local memory, and the media player 133 can access the local memory.

The file management application 127 can start the media player 133 and pass the URL to the media player 133. The media player 133 can transmit a request to stream the media 142 to the URL of the web service 130. As an example, the file management application 127 can execute the media player 133 including the path as an initialization parameter.

Figure 3:
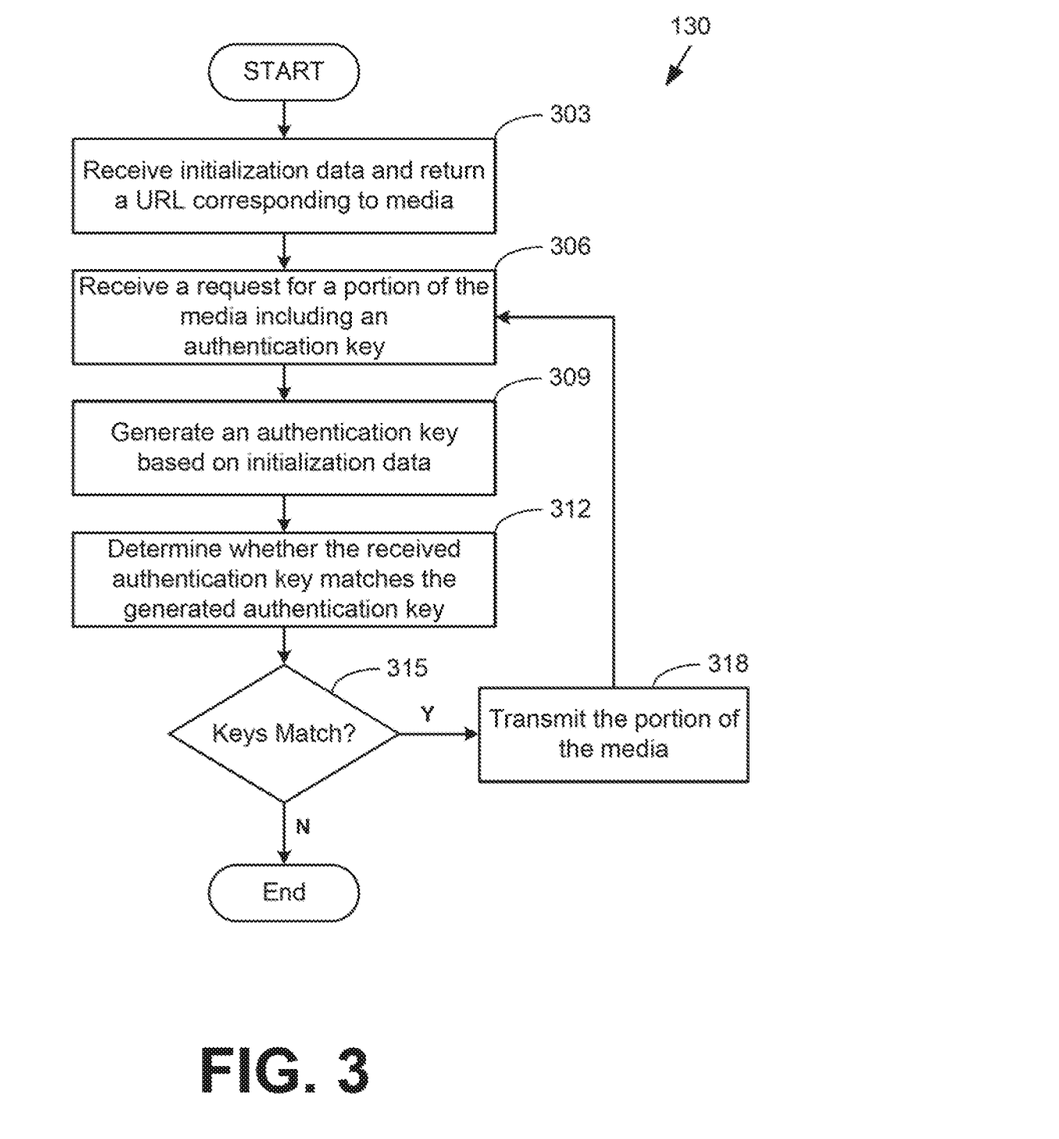

Referring next to FIG. 3, shown is a flowchart that provides one example of the operation of a portion of the web service 130. As an alternative, the flowchart of FIG. 3 can be viewed as depicting an example of elements of a method implemented in the client device 106. FIG. 3 illustrates an example of how the web service 130 can validate the identity of a media player 133 before sending the media 142.

At step 303, the web service 130 receives initialization data. The web service 130 can receive the initialization data sent by the file management application 127 at step 209. The web service 130 can start and listen for connections. As an example, the web service 130 can bind to a socket and port to listen for incoming connections.

The web service 130 can send a URL corresponding to the media 142 to be played to the file management application 127. The URL can be sent by returning the URL when the web service 130 is started. The URL can also be sent by storing the URL in a local memory shared between the file management application 127 and the web service 130. According to one example, the web service 130 can bind to localhost. By binding to localhost, the web service 130 can prevent connections from external devices.

At step 306, the web service 130 receives a request for a portion of media 142 including an authentication key. The web service 130 can receive an HTTP request on the bound socket. The web service 130 can receive an authentication key associated with the request. As an example, the media player 133 can transmit the authentication key to the web service 130 in an HTTP POST or GET variable included in the HTTP request. The media player 133 can also embed the authentication key in the header of the HTTP request. The web service 130 can parse the HTTP header for authentication key stored in the header. In one example, the web service 130 can determine an authentication key from the header of the request.

At step 309, the web service 130 generates an authentication key based on the initialization data. The web service 130 can use an initialization token, an algorithm, and an encryption key from the initialization data to generate the authentication key. To generate a first authentication key, the web service 130 can apply the algorithm to the initialization token to generate a string. The web service 130 can encrypt the resulting string with the encryption key to generate the authentication key. To generate subsequent authentication keys, the web service 130 can apply the algorithm to the previous string to generate the next string. The web service 130 can iteratively generate strings by applying the algorithm to the previous string. The web service 130 can encrypt each of the strings to generate a series of authentication keys.

At step 312, the web service 130 determines whether the received authentication key matches the generated authentication key. The web service 130 can compare the generated authentication key to an authentication key received in the request from the media player 133. As an example, the web service 130 can extract an authentication key from of an HTTP request for a portion of media 142. The authentication key can be extracted from a header of the HTTP request. The web service 130 can compare the received authentication key with the authentication key generated at step 309.

At step 315, the web service 130 proceeds to step 318 if the authentication keys match. The web service 130 can disconnect from the request or ignore the request if the authentication keys fail to match. As an example, the web service 130 can close a socket connection with the requesting application if the authentication keys do not match. The web service 130 can also block future requests from the application when the authentication keys do not match. The web service 130 can transmit a warning message to the management service 115 if the authentication keys do not match. The warning message can include details of the received request including information describing the application transmitting the request.

A compliance rule can be setup in the management service 115 requiring the web service 130 to perform an action if the authentication keys do not match. The compliance rule can be stored in managed devices 118 associated with the client device 106. The action performed can include deleting an application from the client device 106, deleting the corresponding media 142 from data store 124, locking the client device 106, wiping a portion of data from the client device 106, wiping all data from the client device 106, factory resetting the client device 106, displaying a warning message on the display 136, and other actions.

At step 318, the web service 130 transmits the portion of the media. The web service 130 sends a portion of the media 142 if the authentication keys match at step 315. As one example, the web service 130 can decrypt a portion of the media 142. The web service 130 can send the decrypted portion of the media 142 to the media player 133. In another example, the web service 130 decrypts and buffers the media 142 in memory, and sends a portion of the media 142 from memory when the authentication keys match. When the transmission is complete, the web service 130 returns to step 306 to wait for another request.

Figure 4:
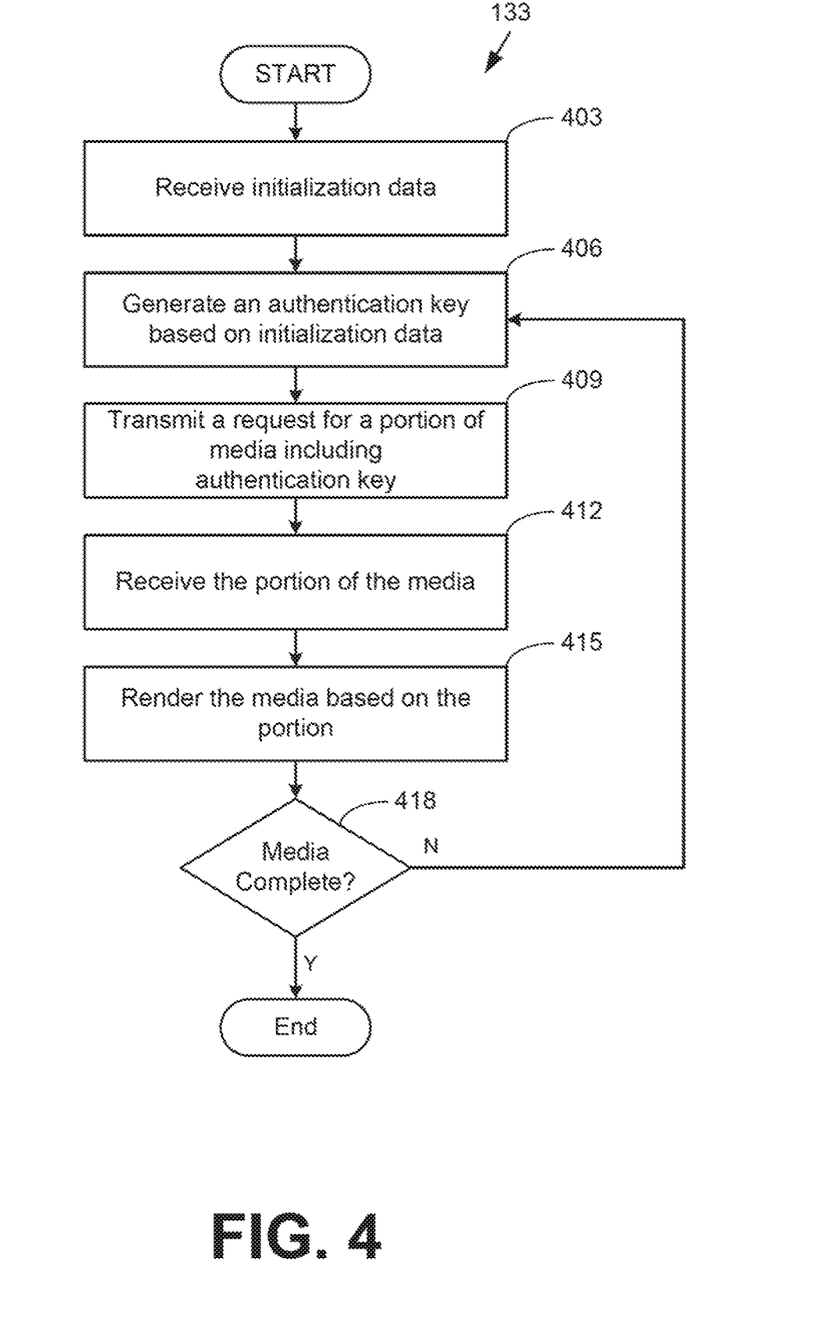

Referring next to FIG. 4, shown is a flowchart that provides one example of the operation of a portion of the media player 133. As an alternative, the flowchart of FIG. 4 can be viewed as depicting an example of elements of a method implemented in the client device 106. FIG. 4 illustrates an example of how the media player 133 can generate and provide authentication keys to a web service 130 and receive portions of media 142.

At step 403, the media player 133 receives initialization data from the file management application 127. The file management application 127 launches the media player 133 in step 212 including the initialization data and a link to the media file on the web service 130. The media player 133 can utilize the initialization data and the link from the file management application 127, such as through initialization parameters.

At step 406, the media player 133 generates an authentication key based on the initialization data. The media player 133 can utilize the initialization data to generate the authentication key. The media player 133 can use an initialization token, an algorithm, and an encryption key from the initialization data to generate the authentication key. To generate a first authentication key, the media player 133 can apply the algorithm to the initialization token to generate a string. The media player 133 can encrypt the string with the encryption key to generate the authentication key. To generate subsequent authentication keys, the media player 133 can apply the algorithm to a prior string to generate the next string in a series. The media player 133 can iteratively generate strings by applying the algorithm to the previous string. The media player 133 can encrypt each of the generated strings to generate a series of authentication keys.

At step 409, the media player 133 transmits a request for a portion of media 142 with the authentication key. The request for the portion of media can include the authentication key generated at step 406. The media player 133 can send the request to the web service 130 using the URL received on initialization. As an example, the media player 133 can transmit an HTTP request to the URL corresponding to the web service 130 with the authentication key in the header of the request.

At step 412, the media player 133 receives the portion of the media file from the web service 130. For example, the media player 133 can receive a response to request for the portion of the media 142 from the web service 130. At step 415, the media player 133 renders the media based on the portion of the media 142. Upon receiving the portion of the media 142, the media player 133 can render the portion of media 142 on the display 136 of the client device 106. If a previously received portion of the media 142 is currently being rendered by the media player 133, then the media player 133 can queue or buffer the new portion of the media 142.

At step 418, the media player 133 determines whether the media 142 is complete. The media player 133 can also request the next portion of the media 142 from the web service 130 while playing the media 142. For example, the media player 133 can proceed to step 406 to obtain the next portion of the media 142. If the received portion of the media 142 corresponds to the end of the media 142, the media player 133 can close the connection with the web service 130. The media player 133 can finish rendering the media 142 until the media 142 completes.

The flowcharts of FIGS. 2-4 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function (s).

Although the flowcharts of FIGS. 2-4 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all of these variations are within the scope of the present disclosure.

The computing environment 103, the client devices 106, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management service 115, the file management application 127, the web service 130, the media player 133, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

The invention claimed is:

1. A method, comprising:
identifying an initialization token that is selected based on a determination that a repeating pattern does not occur by iteratively applying an algorithm to the initialization token over a number of iterations corresponding to a number of portions of a media file;
receiving a request for a portion of the media file including a first authentication key;
generating a string by applying the algorithm to the initialization token;
generating a second authentication key by encrypting the string using an encryption key;
determining whether the first authentication key matches the second authentication key; and
if the first authentication key matches the second authentication key, transmitting the portion of the media file to a location specified by the request.

2. The method of claim 1, further comprising:
receiving a second request for a second portion of the media file including a third authentication key;
generating a second string by applying the algorithm to the string;
generating a fourth authentication key by encrypting the second string using the encryption key; and
determining whether the third authentication key matches the fourth authentication key;
if the third authentication key matches the fourth authentication key, transmitting the second portion of the media file.

3. The method of claim 1, further comprising:
receiving a request to play the media file on a client device;
generating the encryption key, the initialization token, and the algorithm;
identifying a link corresponding to the media file; and
transmitting the link corresponding to the media file, the encryption key, the initialization token, and the algorithm to a media player.

4. The method of claim 3, wherein the request for the portion of the media file originates from the media player.

5. The method of claim 3, further comprising binding to localhost, wherein the link to the media file is a localhost path.

6. The method of claim 3, further comprising:
determining the number of portions of the media file based at least in part on a size of the media file and a size of a single portion of the media file; and
determining a length of the initialization token based at least in part on the number of portions, wherein generating the initialization token further comprises generating a random string including a number of characters equal to the length.

7. The method of claim 3, further comprises:
determining the number of portions of the media file based at least in part on a size of the media file and a size of a single portion of the media file;
iteratively applying the algorithm to a candidate initialization token to generate a plurality of strings;
determining that at least one repeated string occurs in the plurality of strings;
generating the initialization token; and
replacing the candidate initialization token with the initialization token.

8. The method of claim 1, wherein the request for the portion of the media file is received from a media player through an HTTP request over a socket connection and the first authentication key is included in a header of the HTTP request.

9. A non-transitory computer-readable medium embodying a program that, when executed by a client computing device, causes the client computing device to at least:
identify an initialization token that is selected based on a determination that a repeating pattern does not occur by iteratively applying an algorithm to the initialization token over a number of iterations corresponding to a number of portions of a media file;
receive a request for a portion of the media file including a first authentication key;
generate a string by applying the algorithm to the initialization token;
generate a second authentication key by encrypting the string using an encryption key;
determine whether the first authentication key matches the second authentication key; and
if the first authentication key matches the second authentication key, transmit the portion of the media file to a location specified by the request.

10. The non-transitory computer-readable medium of claim 9, wherein the program further causes the client computing device to at least:
receive a second request for a second portion of the media file including a third authentication key;
generate a second string by applying the algorithm to the string;
generate a fourth authentication key by encrypting the second string using the encryption key;
determine whether the third authentication key matches the fourth authentication key; and
if the third authentication key matches the fourth authentication key, transmit the second portion of the media file.

11. The non-transitory computer-readable medium of claim 9, wherein the program further causes the client computing device to at least:
receive a request to play the media file on a client device;
generate the encryption key, the initialization token, and the algorithm;
identify a link corresponding to the media file; and
transmit the link corresponding to the media file, the encryption key, the initialization token, and the algorithm to a media player.

12. The non-transitory computer-readable medium of claim 11, wherein the request for the portion of the media file originates from the media player.

13. The non-transitory computer-readable medium of claim 11, wherein the request for the portion of the media file is received from a media player through an HTTP request over a socket connection and the first authentication key is included in a header of the HTTP request.

14. A system, comprising:
memory; and
a client computing device in communication with the memory, the client computing device being configured to at least:
identify an initialization token that is selected based on a determination that a repeating pattern does not occur by iteratively applying an algorithm to the initialization token over a number of iterations corresponding to a number of portions of a media file;
receive a request for a portion of the media file including a first authentication key;
generate a string by applying the algorithm to the initialization token;
generate a second authentication key by encrypting the string using an encryption key;
determine whether the first authentication key matches the second authentication key; and
if the first authentication key matches the second authentication key, transmit the portion of the media file to a location specified by the request.

15. The system of claim 14, wherein the client computing device is further configured to at least:
receive a second request for a second portion of the media file including a third authentication key;
generate a second string by applying the algorithm to the string;
generate a fourth authentication key by encrypting the second string using the encryption key;
determine whether the third authentication key matches the fourth authentication key; and
if the third authentication key matches the fourth authentication key, transmit the second portion of the media file.

16. The system of claim 14, wherein the request for the portion of the media file is received from a media player through an HTTP request over a socket connection and the first authentication key is included in a header of the HTTP request.

17. The system of claim 16, wherein the client computing device is further configured to at least:
if the first authentication key fails to match the second authentication key, close the socket connection to the media player.

18. The system of claim 14, wherein the client computing device is further configured to at least:
receive a request to play the media file on a client device;
generate the encryption key, the initialization token, and the algorithm;
identify a link corresponding to the media file; and
transmit the link corresponding to the media file, the encryption key, the initialization token, and the algorithm to a media player.

19. The system of claim 18, wherein the request for the portion of the media file originates from the media player.

20. The system of claim 14, wherein the client computing device is further configured to at least:
determine the number of portions of the media file based at least in part on a size of the media file and a size of a single portion of the media file;
determine a length of the initialization token based at least in part on the number of portions; and generate the initialization token by generating a random string including a number of characters equal to the length.

\* \* \* \* \*